United States Patent [19]

Proebstel

[11] Patent Number: 5,175,614
[45] Date of Patent: Dec. 29, 1992

[54] VECTORSCOPE AUTOMATIC BURST POSITIONING

[75] Inventor: Robert Proebstel, Hillsboro, Oreg.

[73] Assignee: Tektronix, Inc., Wilsonville, Oreg.

[21] Appl. No.: 676,052

[22] Filed: Mar. 27, 1991

[51] Int. Cl.⁵ .......................................... H04N 17/02
[52] U.S. Cl. ...................................... 358/10; 358/25; 358/28
[58] Field of Search ............. 358/10, 25, 28, 19, 358/139; 324/88

[56] References Cited

U.S. PATENT DOCUMENTS 3,820,156  6/1974  Schulz ................................... 358/10
4,488,168 12/1984  Mino .................................... 358/10

FOREIGN PATENT DOCUMENTS 0276394 11/1988 Japan .

Primary Examiner—Howard W. Britton
Assistant Examiner—Minsun Oh
Attorney, Agent, or Firm—Francis I. Gray

[57] ABSTRACT

Vectorscope automatic burst positioning for properly aligning a vectorscope display uses a microprocessor (22) to control a phase shifter (14) according to the amplitudes of the chrominance components demodulated from an input color video signal during the burst interval. The demodulated chrominance components are sampled and digitized (18), and the digitized values are tested to determine whether they fall within a predetermined window. The microprocessor applies a statistical approach over a range of phase values to compute a final phase control signal value for the phase shifter that properly aligns the vectorscope display.

7 Claims, 3 Drawing Sheets

VECTORSCOPE AUTOMATIC BURST POSITIONING

BACKGROUND OF THE INVENTION

The present invention relates to vectorscopes, and more particularly to vectorscope automatic burst positioning for rotating the display of a vectorscope to the correct graticule location.

An important instrument in the measuring of the characteristics of a color video signal is a vectorscope. A vectorscope is a specialized oscilloscope that demodulates the color video signal and presents a display of R-Y versus B-Y, i.e., the two chrominance components that contain the color information within the color video signal. The angle and magnitude of the displayed vectors are related respectively to hue and saturation. To properly align the vector display on the vectorscope a vector representing a burst signal portion of the color video signal is adjusted to be parallel to the horizontal axis of the display. In prior art vectorscopes, such as the 1700 Series manufactured by Tektronix, Inc. of Beaverton, Oreg., United States of America, the adjustment of the vector display is performed by manually manipulating a front panel knob and observing the vector display. The manipulation of the front panel knob provides a signal to a phase shifter within the vectorscope that affects the phase of a regenerated subcarrier signal derived from the burst signal portion of the color video signal As the phase is changed, the vector display rotates until the burst signal vector is aligned with the horizontal axis. Since the graticule for some vectorscopes includes an angular offset from the horizontal graticule, alignment of the burst signal vector provides for ease in determining subcarrier to horizontal sync (SCH) phase errors.

What is desired is a method of rotating the vector display automatically to properly align the vector display with the display graticule to make the vectorscope easier to use and to save user time.

SUMMARY OF THE INVENTION

Accordingly the present invention provides vectorscope automatic burst positioning by rotating the display of the vectorscope to a correct position relative to a display graticule under microprocessor control. The two chrominance components demodulated from an input color video signal are sampled during the burst time of the color video signal. The sampled component signals drive an analog to digital conversion circuit, the output of which is read by the microprocessor. The microprocessor determines the angle of the burst signal vector by processing the sampled chrominance values. If the angle is not proper, then the microprocessor increments the phase by a small amount to rotate the vector display slightly, and then resamples the burst signal vector position. Once the burst signal vector position is correct, the microprocessor stops the rotation of the vector display.

The objects, advantages and other novel features of the present invention are apparent from the following detailed description when read in conjunction with the appended claims and attached drawing.

DESCRIPTION OF THE PREFERRED EMBODIMENT

Figure 1:
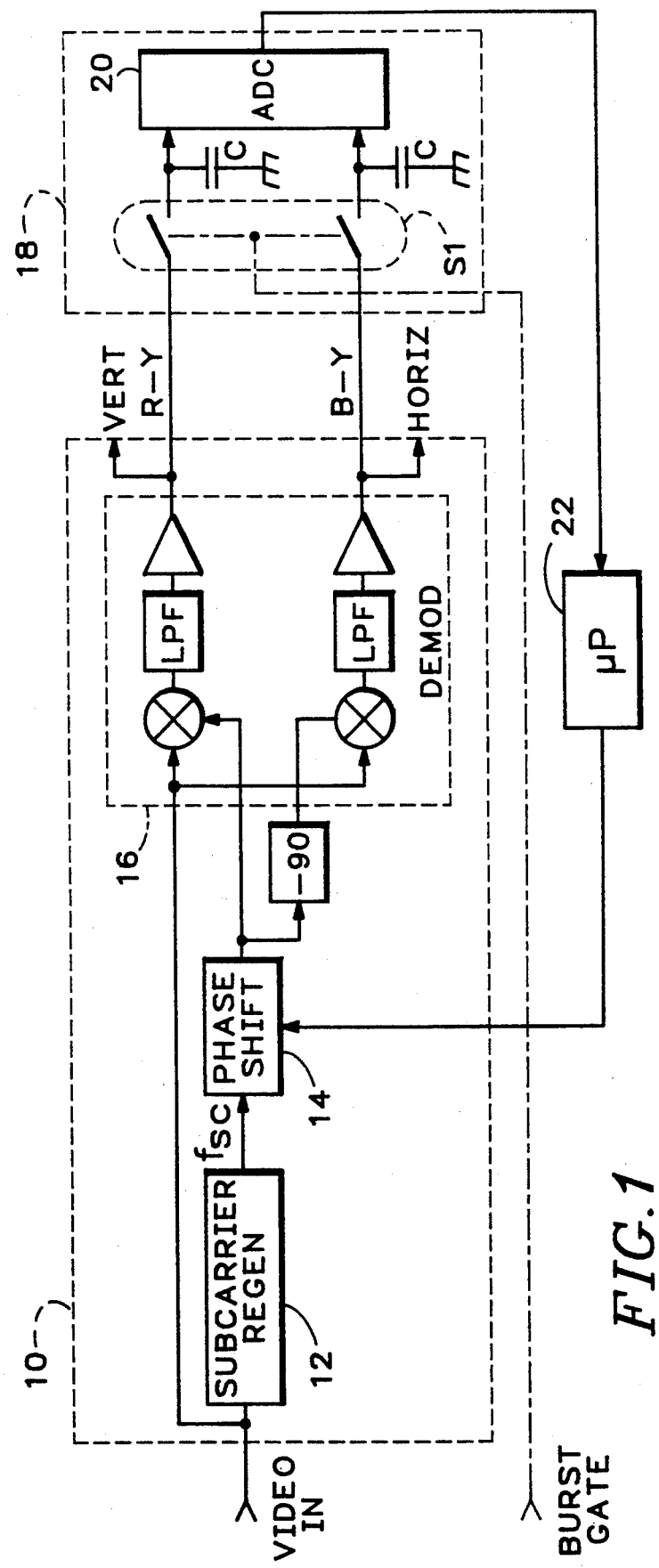
FIG. 1 is a block diagram of a vectorscope including an automatic burst positioning circuit according to the present invention.

Referring now to FIG. 1 a conventional vectorscope 10 has a subcarrier regenerator circuit 12 that recovers a subcarrier frequency, fsc, from the burst signal portion of an input color video signal. The regenerated subcarrier frequency is input to a phase shifter 14. The subcarrier frequency from the phase shifter 14 is input in phase quadrature to a demodulator circuit 16 together with the inputs color video signal. The output from the demodulator circuit 16 are the two chrominance vectors, R-Y and B-Y for an NTSC standard color video signal. The two chrominance vectors are applied to the vertical and horizontal drive circuits, respectively, of a display device such as a cathode ray tube (CRT) to provide the vector display.

The two chrominance vector signals also are input to a zero adjust circuit 18 together with a burst gate signal, derived from the input color video signal as is well known in the art. The zero adjust circuit 18 includes a sample and hold circuit for each chrominance vector signal, represented by a switch S1 controlled by the burst gate signal and respective capacitors C. The sampled chrominance vector signals are input to an analog to digital converter 20 to produce an output signal. In one implementation the analog to digital converter 20 is a simple window detector that can be thought of as a one-bit analog to digital converter. However analog to digital converters with more bits may be used to determine the position of the burst vector during the burst gate time.

Figure 2:
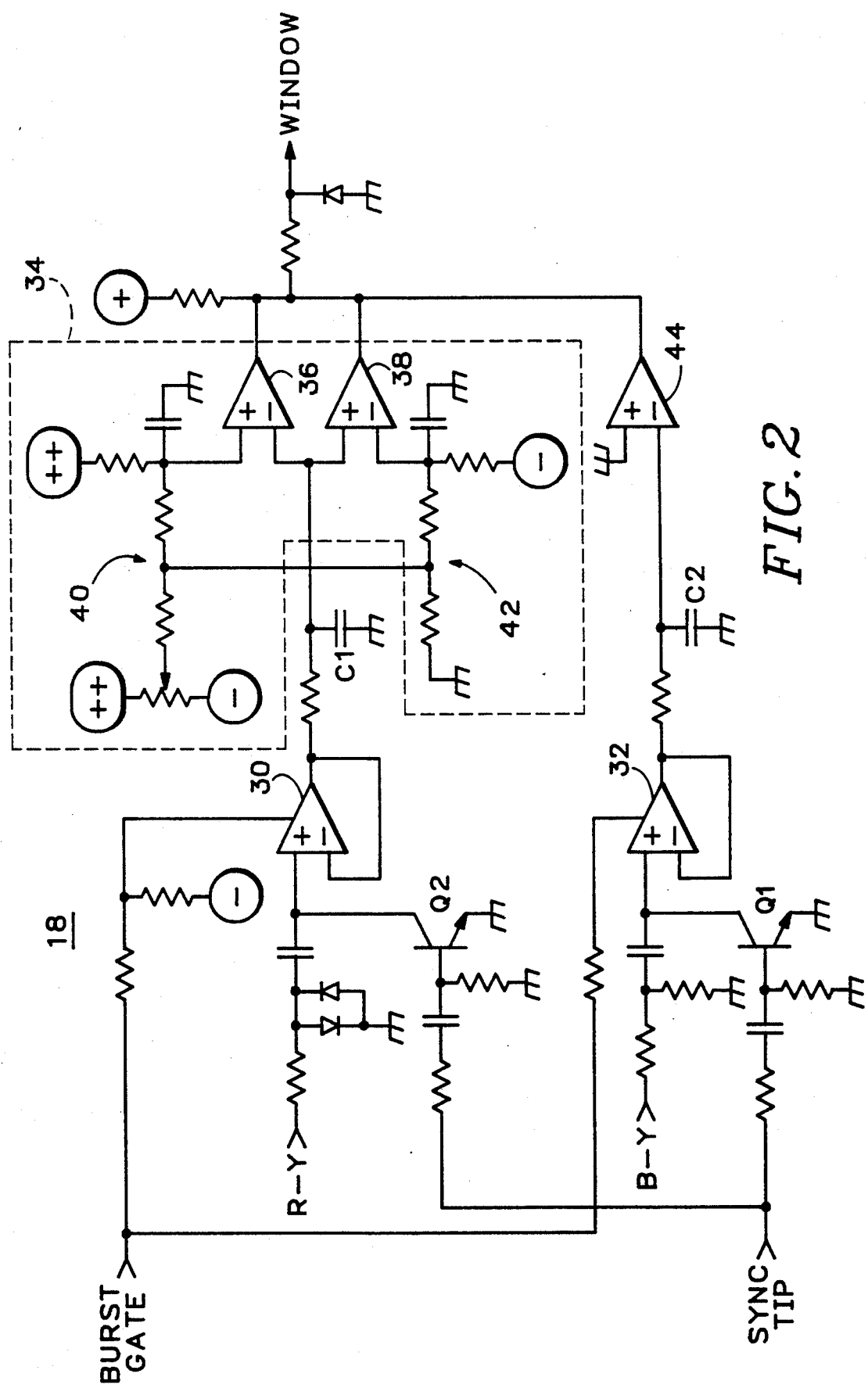
FIG. 2 is a schematic diagram of a zero adjust circuit for the vectorscope automatic burst positioning circuit according to the present invention.

The zero adjust circuit 18 is shown in greater detail in FIG. 2. A sync tip signal, occurring during each horizontal sync pulse of the input color video signal, is applied to respective clamp transistors Q1, Q2 to provide a baseline for comparison at the non-inverting inputs of respective gate sampling circuits 30, 32. The R-Y and B-Y signals from the demodulator 16 are a.c. coupled also to the non-inverting inputs of the respective gate sampling circuits 30, 32. Shortly after the sync tip pulse of the sync tip signal, a burst gate pulse that spans the burst signal interval of the input color video signal gates on the gate sampling circuits 30, 32 to store a sample of the R-Y and B-Y signals during the burst interval on respective hold capacitors C1, C2. During the burst gate pulse the two chrominance signals are approximately at a constant level since the burst signal does not vary in frequency during the interval, unlike active video. Vector display burst alignment for NTSC is indicated by the R-Y value during the burst gate interval being approximately zero while the B-Y value is at a negative value.

The R-Y sample on capacitor C1 is applied to a window detector 34 having a pair of comparators 36, 38 with associated level networks 40, 42. The R-Y sample is input to the inverting input of the first comparator 36 and to the non-inverting input of the second comparator 38. A small positive level value from the first level network 40 is applied to the non-inverting input of the first comparator 36, and a small negative level value from the second level network 42 is applied to the inverting input of the second comparator 38. The levels set by the respective level networks 40, 42 define an amplitude window about zero. The B-Y signal is inverted by inverter 44 and AND'd together with the outputs of the window comparators 36, 38 to produce a WINDOW signal when the R-Y signal has a level within the defined window and the B-Y signal is negative.

Figure 3:
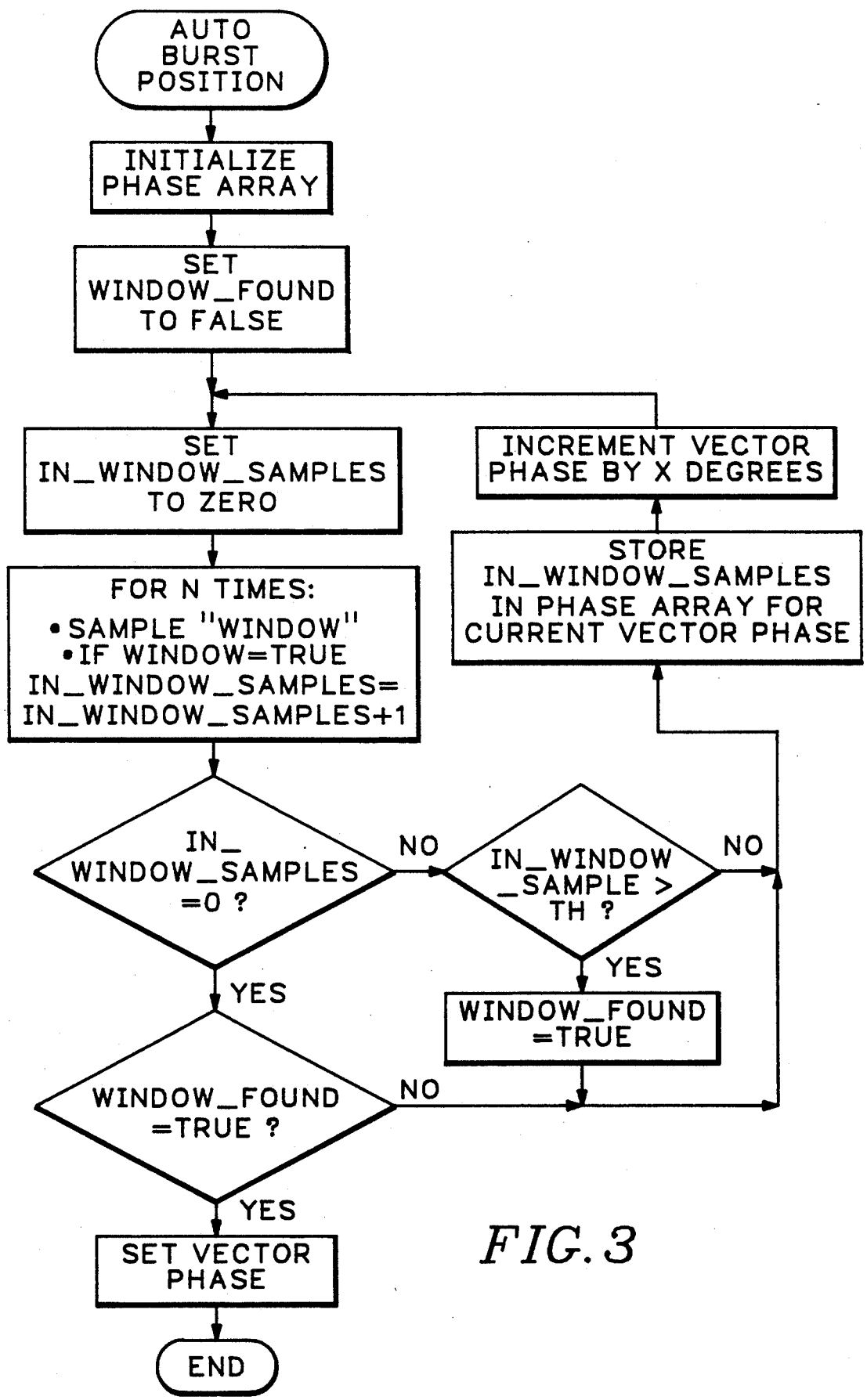
FIG. 3 is a flow chart diagram of the microprocessor control of the vectorscope automatic burst positioning according to the present invention.

The digitized sample values for the chrominance components from the analog to digital converter 20, or the WINDOW signal as described above, are input to a processor 22. The processor 22 applies a phase shift control signal to the phase shifter 14 as a function of the input from the analog to digital converter 20. As shown in FIG. 3 for the zero adjust circuit of FIG. 2, when an auto burst position button is pushed on the front panel, the processor 22 enters an auto burst positioning program. A phase array, having an abscissa representing increments of vector phase and an ordinate representing number of hits within the window defined by the comparators 36, 38, is initialized to all zeros. A WINDOW_FOUND indicator is set to FALSE and IN_WINDOW SAMPLES is set to zero. For N successive burst gate pulses the WINDOW signal is tested by the processor 22 to determine whether the WINDOW signal is TRUE or FALSE. For each TRUE value of the WINDOW signal, IN_WINDOW_SAMPLES is incremented by one. At the completion of N burst gate pulses, IN_WINDOW_SAMPLES is tested to see if it is equal to zero and, if not, if it exceeds a threshold value TH. The value of IN_WINDOW_SAMPLES represents the number of times, or "hits", that the R-Y sample was within the window defined by the comparators 36, 38 during the N samples.

If the number of hits indicated by IN_WINDOW_SAMPLES exceeds the threshold, TH, then WINDOW_FOUND is set TRUE and the value of IN_WINDOW_SAMPLES is stored in the phase array for the current vector phase increment. The phase shift control signal is then incremented by the processor 22, IN_WINDOW SAMPLES is reset to zero, and the next N samples of the WINDOW signal are tested. If for a given phase increment IN_WINDOW_SAMPLES remains equal to zero after N samples of the WINDOW signal and WINDOW_FOUND is TRUE, indicating that prior phase increments had non-zero values for IN_WINDOW_SAMPLES, then the data gathering phase of the auto burst positioning program is complete and the processor 22 moves on to a computation phase.

In the computation phase, since the distribution of hits within the window defined by the comparators 36, 38 is deemed to be approximately Gaussian over a phase interval covering many phase increments, the processor 22 calculates a center of mass for the phase array to determine a final phase shift control signal to apply to the phase shifter 14. For NTSC standard color video signals the center of mass represents the final phase shift control signal. The final phase shift control is applied to the phase shifter 14 by the processor 22 and the auto burst phase positioning program is exited.

Since for PAL standard color video signals there are four possible burst vector positions, and the burst vector positions are +/−45 degrees about the horizontal axis of the display, alternate burst gate pulses are used to reduce the number of burst vector positions to two, and the negative of the one chrominance component is used to reduce that to one, as in the NTSC implementation. However the center of mass determined by the processor 22 needs to be then offset by the +45 degrees to obtain the final phase shift control signal for the phase shifter 14. Alternatively if every burst gate signal is used, then there are two centers of mass at +/−45 degrees. In this situation the final phase shift control signal is determined by averaging the two centers of mass.

For embodiments where the two chrominance components are each independently digitized with a multibit analog to digital converter 20, the digitized sample values are input to the processor 22 and the processor determines the approximate angle of the burst vector relative to the horizontal. Based upon the angle the processor 22 determines the direction and approximate amount to increment the phase shifter until within the range when the hits occur within a window defined by the processor. Then the smallest phase increments are used to fill the phase array as described above.

Thus the present invention provides automatic burst positioning for a vectorscope display by determining whether the burst component of an input color video signal occurs along a designated axis of the vectorscope display, and then adjusting and testing in an iterative fashion using a microprocessor until the burst component lies along the designated axis.

What is claimed is:
1. A method of automatic positioning of a vectorscope display comprising the steps of:
   determining the amplitudes of chrominance components demodulated from an input color video signal during a burst gate signal corresponding to the burst interval of the input color video signal; and
   adjusting the phase of the regenerated subcarrier signal derived from the burst portion of the input color video signal according to the determined amplitudes of the chrominance components until a burst vector representing the burst portion lies along a designated axis of the vectorscope display.
2. A method as recited in claim 1 wherein the adjusting step comprises the steps of:
   building a phase array from the amplitude of the chrominance components, the phase array representing a graph of the number of times the determined amplitude of one of the chrominance components is within a predetermined range of amplitude values for each of a plurality of phase increment values; and
   computing from the phase array a final control signal that determines the phase of the regenerated subcarrier signal so that the burst vector lies along the designated axis.
3. An automatic burst positioning circuit for a vectorscope comprising:
   means for determining (18) the amplitudes of chrominance components demodulated from an input color video signal during a burst gate signal corresponding to the burst interval of the input color video signal; and
   means for adjusting (22) the phase of a regenerated subcarrier signal derived from the burst portion of the input color video according to the determined amplitudes of the chrominance components until a burst vector representing the burst portion lies along a designated axis of the vectorscope display.

4. A circuit as recited in claim 3 wherein the determining means comprises:
   means for sampling (S1,C) the demodulated chrominance components during the burst gate signal to obtain the amplitudes; and
   means for digitizing (20) the amplitudes prior to input to the adjusting means.

5. A circuit as recited in claim 4 wherein the digitizing means comprises a window comparator for providing an output signal to the adjusting means when the amplitude of one of the chrominance components is within a predetermined range of amplitude values.

6. A circuit as recited in claim 5 wherein the digitizing means further comprises means for determining the polarity of the amplitude of another of the chrominance components so that the output signal is provided to the adjusting means when the amplitude of the one chrominance component is within the predetermined range and the amplitude of the another chrominance component is of a predetermined polarity.

7. A circuit as recited in claim 3 wherein the adjusting means comprises:
   means for building a phase array from the amplitudes of the chrominance components, the phase array representing a graph of the number of times the determined amplitude of one of the chrominance components is within a predetermined range of amplitude values for each of a plurality of phase increment values; and
   means for computing from the phase array a final control signal that determines the phase of the regenerated subcarrier signal so that the burst vector lies along the designated axis.

* * * * *